United States Patent [19]

Alber

[11] Patent Number: 5,246,082
[45] Date of Patent: Sep. 21, 1993

[54] SMALL VEHICLE, PARTICULARLY ROLLING CHAIR WITH FOLDABLE CHAIR FRAME

[75] Inventor: Ulrich Alber, Albstadt-Laufen, Fed. Rep. of Germany

[73] Assignee: Haas & Alber Haustechnik Und Apparatebau GmbH, Albstadt-Ebingen, Fed. Rep. of Germany

[21] Appl. No.: 929,303

[22] Filed: Aug. 13, 1992

[30] Foreign Application Priority Data

Aug. 17, 1991 [DE] Fed. Rep. of Germany ....... 4127257

[51] Int. Cl.$^5$ .............................................. B60K 1/00
[52] U.S. Cl. .................................. 180/65.5; 301/6.1; 180/907
[58] Field of Search ...................... 180/65.1, 65.5, 907; 301/6.1, 6.5

[56] References Cited

U.S. PATENT DOCUMENTS

| | | | |
|---|---|---|---|
| 3,892,300 | 7/1975 | Hapeman et al. | 180/65.5 |
| 3,908,776 | 9/1975 | Dudley | 180/65.5 |
| 3,955,639 | 5/1976 | Cragg | 180/65.5 |
| 4,504,094 | 3/1985 | Burrows | |
| 4,930,590 | 6/1990 | Love et al. | 180/65.5 |

FOREIGN PATENT DOCUMENTS 3924817 1/1991 Fed. Rep. of Germany.
1518349 7/1978 United Kingdom.

*Primary Examiner*—Richard M. Camby
*Attorney, Agent, or Firm*—Michael J. Striker

[57] ABSTRACT

A small vehicle, in particular a rolling chair, has a frame, at least two running wheels having hubs, a direct current motor provided with a transmission and a stator and located in a region of each of the hubs so as to drive a respective one of the running wheels. The running wheels are formed as movable wheels provided with plug-in axles releasable fixable on the frame. Each of the direct current motors with a respective one of the transmissions is arranged inside a respective one of the hubs without projecting beyond the latter. And a supporting part such that, each of stators of each of the direct current motors are fixable releasably on the frame through the supporting part.

14 Claims, 5 Drawing Sheets

SMALL VEHICLE, PARTICULARLY ROLLING CHAIR WITH FOLDABLE CHAIR FRAME

BACKGROUND OF THE INVENTION

The present invention relates to a small vehicle, and in particular to a rolling chair with a chair frame having at least two running wheels driveable by a direct current motor with a transmission in the region of their hubs.

Small vehicles which are operated by electric motors and also with rechargeable batteries as well as rolling chairs operated by electric motors are generally known in the art. Electric-motor operated rolling chairs have the disadvantage that in contrast to the manually operated rolling chairs they cannot be brought to a form which is suitable for their transportation in the trunk of a normal passenger vehicle. An electric motor operated rolling chair is known, in which the drive motors are formed as hub motors. Thereby however in a not folded chair frame more space for the arrangement of the batteries is provided. The wheel hub motors extend beyond the running wheel plane to the chair frame and require a special bearing frame which is fixed on the chair frame and provided for the running wheels. When the electric motors for the manual operation of the running wheels are uncoupled, the rolling chair driver must move a part of the drive transmission since the coupling is arranged inside the utilized transmission.

SUMMARY OF THE INVENTION

Accordingly, it is an object of the present invention to provide an electric motor operated small vehicle, particularly an electric motor operated rolling chair with hub motors, which avoids the disadvantages of the prior art.

More particularly, it is an object of the present invention to provide an electric motor operated small vehicle of the above mentioned type, especially a rolling chair, which can be easily disassembled into individual parts for transportation.

In keeping with these objects and with others which will become apparent hereinafter, one feature of the present invention resides, briefly stated, in a small vehicle of the above mentioned type, in which the running wheels are formed as removable wheels which are provided with a plug-in axle releasably fixable in the frame, each direct current motor with its transmission is arranged without projecting outwardly inside the driveable wheel hub, and the stator of each direct current motor is fixable via a chair part releasably on the frame, in particular a foldable rolling chair frame.

The small vehicle formed in accordance with the present invention has the advantage that its running wheels together with its drive motor can be removed with a simple handle from the vehicle frame, as known for example in motor-less, foldable rolling chairs. The vehicle frame, especially a rolling chair frame remains not loaded by the drive motors to its running wheels so that it can be designed foldable as in the known motor-less rolling chairs.

In accordance with the invention the commercially available motorless rolling chairs with foldable chair frames can be equipped with an electric motor drive subsequently. A frame extension can be provided for receiving the batteries. It is supportable at least on the removable running wheels and is removable for the transportation of the rolling chair. The frame construction and the free frame space remain unaffected by the hub motors since the motors do not extend behind the running wheel plane. A mounting point for a supporting part must however be formed on the frame so that the stator of each direct current motor is supported with it in a rotation-fixed manner. The electrical current supply and the control of both hub motors can be performed by a releasable plug-in connection for the electrical conduits, arranged on the supporting part for the motor armature.

The drive motors can be formed preferably as multi-pole, electronically commutating, brushless direct current motors with a permanent magnet rotor, and the subsequently connected transmission can be formed as a planet wheel transmission. Thereby a compact, space economical and relatively low weight drive unit is provided. It brings an additional advantage in that the commutating direct current motor has a higher efficiency than a conventional direct current shunt motor and thereby the current consumption from the batteries can be reduced. The running wheels with the integrated drive part can be produced with a weight which allows a woman to load and unload the running wheels in and out of a passenger vehicle. The commutating direct current motor has also the advantage that in travel it also can operate as a generator and supply the current back to the battery.

The control device for the electric drive in accordance with the present invention can be incorporated in a master processor with the related part for the driver on the vehicle frame and in two subsequently arranged motor processor parts, which are arranged at least partially near the motor in the running wheel hubs and integrated in the drive part. Thereby many control conductors are dispensed with and a well releasable, repair-convenient operation of the parts is provided which also increase the important operational safety of an electric motor-operated rolling chair.

In the small vehicle formed in accordance with the present invention a vehicle user or a rolling chair user can advantageously arrange the actuatable coupling between the transmission of the hub motors and the hub. Therefore with the released coupling no parts must be moved together in the transmission mounted in the running wheels. Advantageously, the coupling can have a toothed disc connected with a planet carrier of the planet wheel transmission.

Drivers which are adjustably arranged in the wheel hub are engageable in the toothed disc and disengageable by a switching ring which is supported on the hub outer side and is easily accessible by the vehicle user. The driver of the coupling can be formed as a two-arm turning lever supported in the wheel hub. On its free end it has a coupling arresting projection cooperating with a toothed disc and with its another free end it cooperates with a control surface which is formed on the switching ring concentrically supported on the hub.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
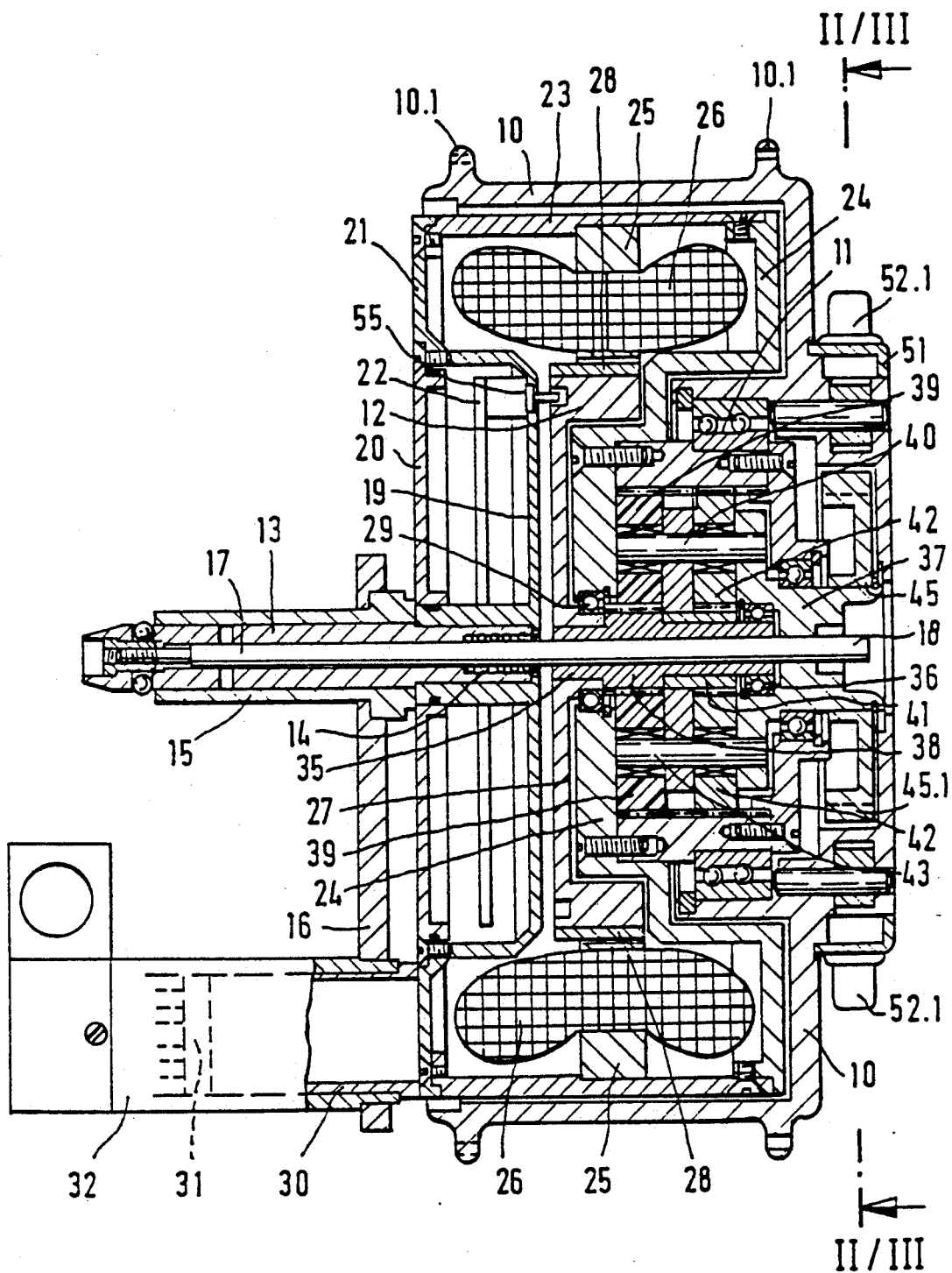
FIG. 1 is a view showing a central longitudinal section of a hub of a running wheel for a rolling chair with a built-in drive part, in accordance with the present invention.

The central longitudinal section of FIG. 1 shows a compact construction of a drive for a greater running wheel of a rolling chair, which is composed of an electric motor, a planet wheel transmission and a coupling. All parts are arranged in a cup-shaped wheel hub 10 which is supported via a ball bearing 11 on a toothed rim carrier 12 of a planet wheel transmission. The stationary part of the drive device includes a concentric plug-in axle 13 which is supported in a bush 14 and insertable into an adaptor sleeve 15 mounted together with an abutment wall 16 on a not shown rolling chair. The plug-in axle 17 is disengageable from the adaptor sleeve 15 by a ball locking pin 17, which is known, in the plug-in wheels and is longitudinally displaceable by an actuating pin 18 extending through the hub housing. Ring webs 10.1 with openings for fixing not shown spokes of the running wheels are formed on the hub 10.

The stationary bush 14 forms a center of a housing trough 19 which is sealingly closed by a cover 20 and has an outer ring flange 21. A guiding plate 22 with parts of a control device is arranged in a protected manner inside the housing trough.

A ring wall 23 which extends in the wheel hub 10 with a small distance is connected with the outer ring flange 21 of the housing ball 19. It forms a part of a protective housing for an electric drive motor and is releasably connected with a stationarily held motor carrier body 24. A ring-shaped stator carrier 24 for a stator winding 26 assembled of individual pole windings is mounted on the ring wall 23. The disc-shaped rotor 27 of the direct current motor is provided on its expanded outer edge with permanent magnet 28 and supported via a ball bearing 29 in the motor carrier body 24. The latter serves simultaneously as a carrier body for parts of the planet wheel transmission, such as for the toothed rim carrier 12.

A plug-in tube 30 is mounted on the outer ring flange 21 of the trough housing 19 on a peripheral point. During plugging in of the running wheel it is also pluggable into an adaptor sleeve 32 mounted on the rolling chair frame. Through the plug-in tube 30, the stationary parts of the drive device are supported on the rolling chair frame. Moreover, this tube guides in a not shown manner the connecting conductors for the stator winding 26 of the direct current motor and to the conductor plate 22, up to an electrical plug-in body at the end of the plug-in tube 30 with several plugs which cooperate with a not shown matching plug outlet arranged on the adaptor sleeve 32.

The rotor 27 of the direct current motor is connected with a hollow shaft 35 and supported via a ball bearing 36 in a planet wheel support 37 for a second planet wheel stage. A sun wheel 38 for a first stage of the planet wheel transmission is formed on the hollow shaft 35 and engages with planet wheels 39 of the first stage arranged on the bearing pin 40. A sun wheel 41 for the second stage of the planet wheel transmission is arranged concentrically as a hollow wheel on the hollow shaft 35 and engages with planet wheels 42 of the second stage arranged on the bearing pins 43. The bearing pins 43 for the planet wheels 42 of the second set are mounted in the planet wheel carrier 37. All planet wheels 39 and 42 engage with inner toothed rims of the stationary toothed rim carrier 12.

Through the two-stage planet wheel transmission the torque supplied from the rotor 27 of the direct current motor is transmitted to the ball bearing supported planet wheel carrier 37 and from it through a coupling to the hub 10.

Figure 2:
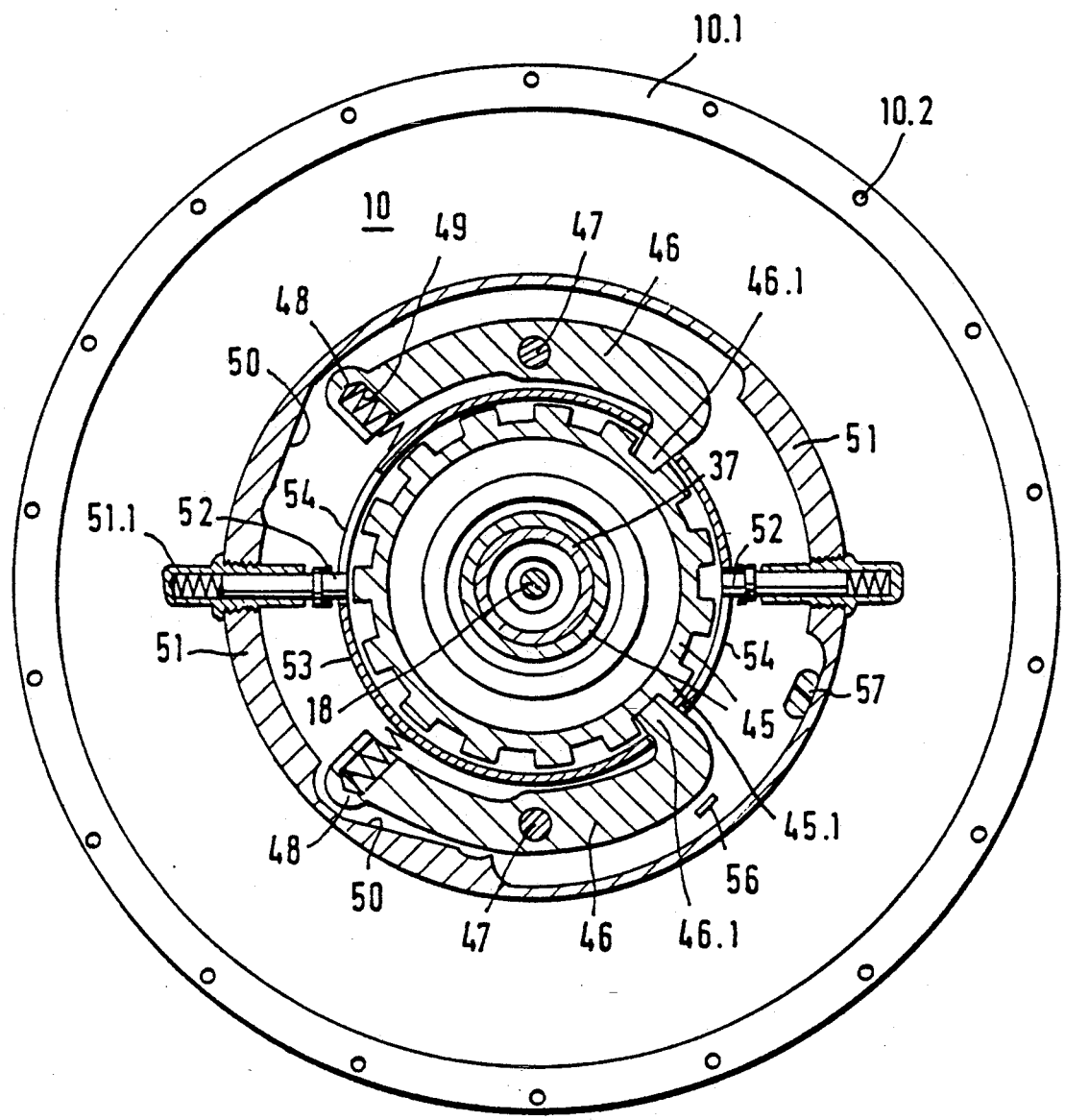
FIGS. 2 and 3 are views showing sections through a drive coupling, taken along the lines II/III—II/III in FIG. 1, with a connected and released coupling, respectively.
Figure 3:
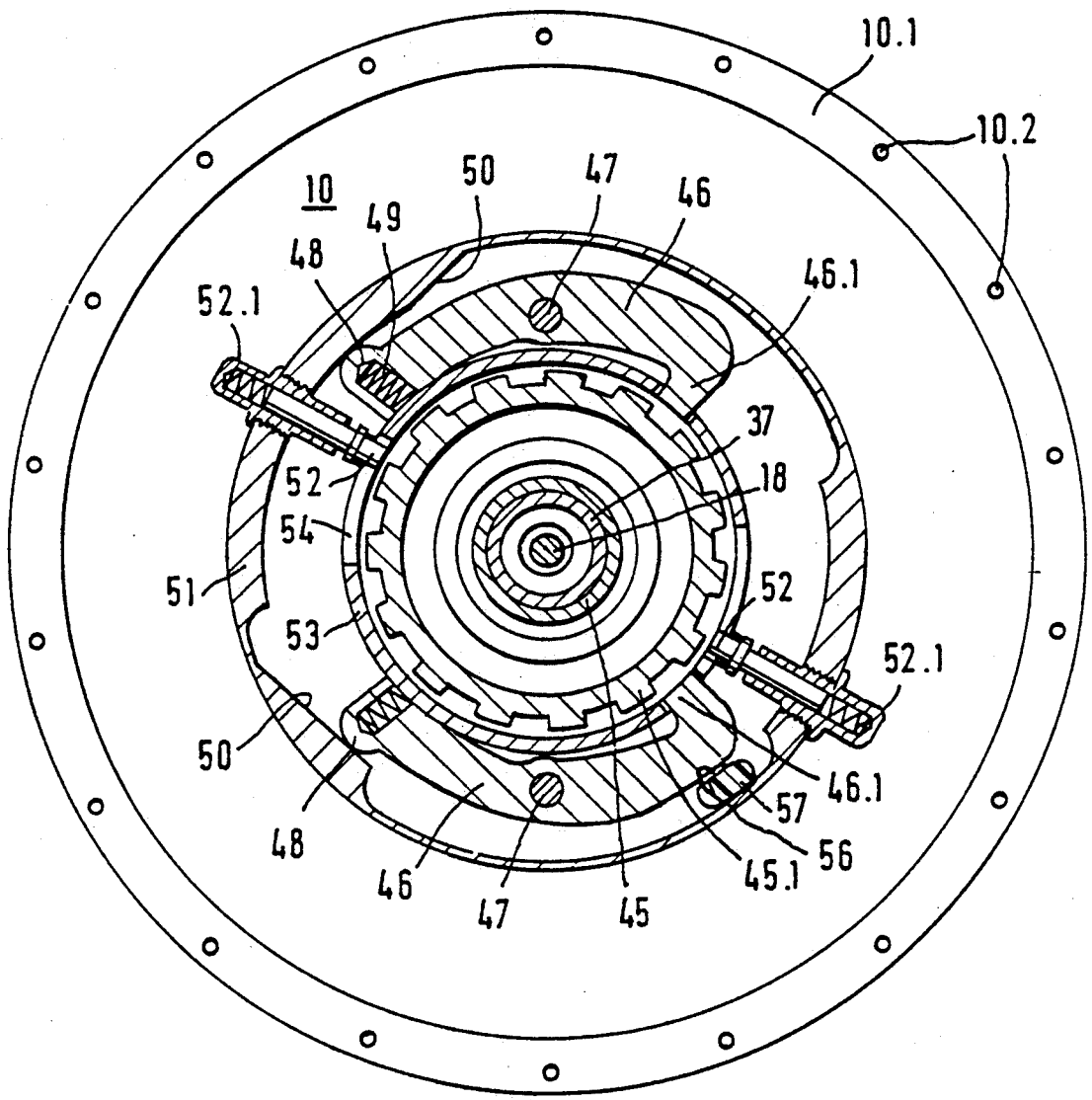

The coupling with its parts shown in plan view in FIGS. 2 and 3 has a driver-toothed disc 45 fixedly connected with the planet wheel carrier 37 and having teeth 45.1 engageable with teeth 46.1 of the coupling drivers 46. Two coupling drivers are provided and formed as two-arm lever turnable about a bearing pin 47 fixed in the hub 10. The driver teeth 46.1 are located at the free end of one of the lever arms. The another lever arm is provided on its free end with a sliding cam 48. At this point a pressure spring 49 engages the coupling driver 46 and prestresses the latter to its engaging position shown in FIG. 2. The sliding cam 48 of the coupling driver 46 cooperates with inclined control surfaces 50 formed inwardly on a switching ring 51 which is arranged concentrically on the outer side of the hub 10. Due to a relative turning of the switching ring 51 which is limited by the abutment 52, the inclined control surfaces 50 of the switching ring provide turning of the coupling driver 46 to a releasing position shown in FIG. 3. In this position the arresting teeth 46.1 disengage from the driver toothed disc and thereby the driving connection between the motor-side planet wheel carrier 37 and the hub 10 of the running wheel is interrupted. In this uncoupled position the running wheels can be driven manually by a rolling chair driver without turning a part of the planet wheel transmission by the rolling chair driver.

The prestressing rings 49 for the coupling drivers 46 are supported on a ring flange 53. The flange is provided with slots 54 for the abutment 52 of the switching wheel 51 provided with outwardly located screw heads 52.1. The ring flange 53 has also guiding openings for the arresting teeth 46.1 of the coupling driver 46. In order to secure that the electrical drive of the rolling chair is operational only when both wheels are coupled, each wheel hub is associated with a safety switch of a safety circuit of a control device. In the shown embodiment the switch includes a contact tongue 56 which freely lies in a coupled condition on the wheel as shown in FIG. 2. It is acted upon by the driver 46 when it is uncoupled, and held by an elastic counter pressure body 57 in its contact position on the driver 46. The counter contact is formed by the driver 46; however, it can also be formed in the body 57.

Figure 4:
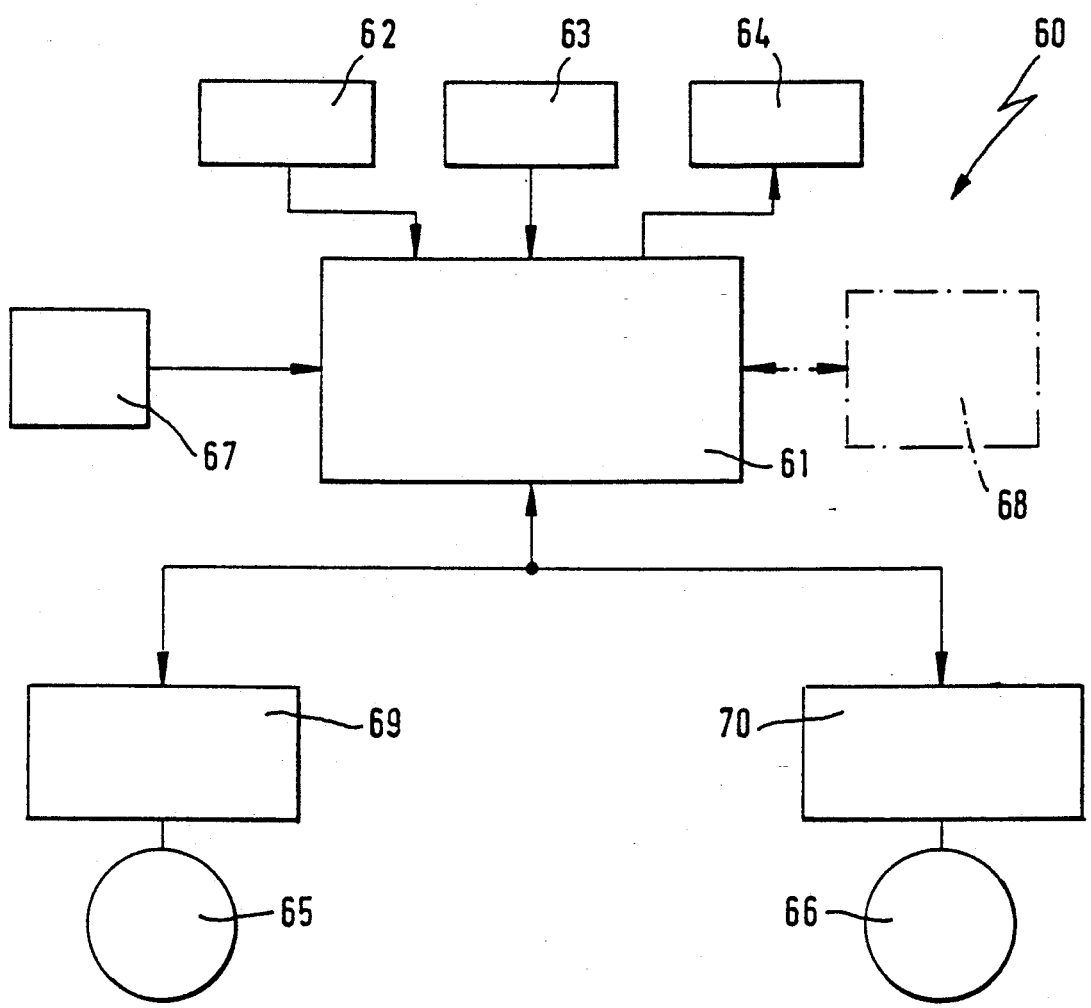
FIG. 4 is a schematic diagram of an electrical control device for the rolling chair in accordance with the present invention.

The electrical switching plate 22 which is arranged in the housing trough 19 as shown in FIG. 1 is associated with so-called Hall generators 15 as electromagnetically operating control probes. They extend through the housing wall to the region of action of the permanent magnet 28 of the rotor 27 of the direct current motor permanent magnet. The electrical control 64 for the rolling chair drive is shown in a diagram in FIG. 4. It includes a master processor 61 arranged in the rolling chair frame in a corresponding point and connected with an operation board having a matching switch 62, a cross control base stick 63 and an indicating device 64. The control current is supplied by the master processor to both electric motors 65 and 66 of both great running wheels of the rolling chair controlled from an accumulator 67. The master processor 61 also controls the charging of the accumulators 67 on a charging terminal 68 shown in broken lines. The master processor is connected with two motor processors 69 and 70 for both drive motors 65 and 66. The motor processor 69 or 70 are formed at least partially on the electrical switching plate 22 and connected via the plug 31 of the releasable running wheel with the master processor 61 or in some cases with other parts of the motor processor 69 or 70 arranged on the rolling chair frame. The Hall generators 64 belong to the associated motor processor 69 or 70 and serve for controlling the commutation of the multi-pole stator winding 26 in dependence on the instantaneous position of the permanent magnet-rotors 27 of the direct current motors 65 or 66.

Figure 5:
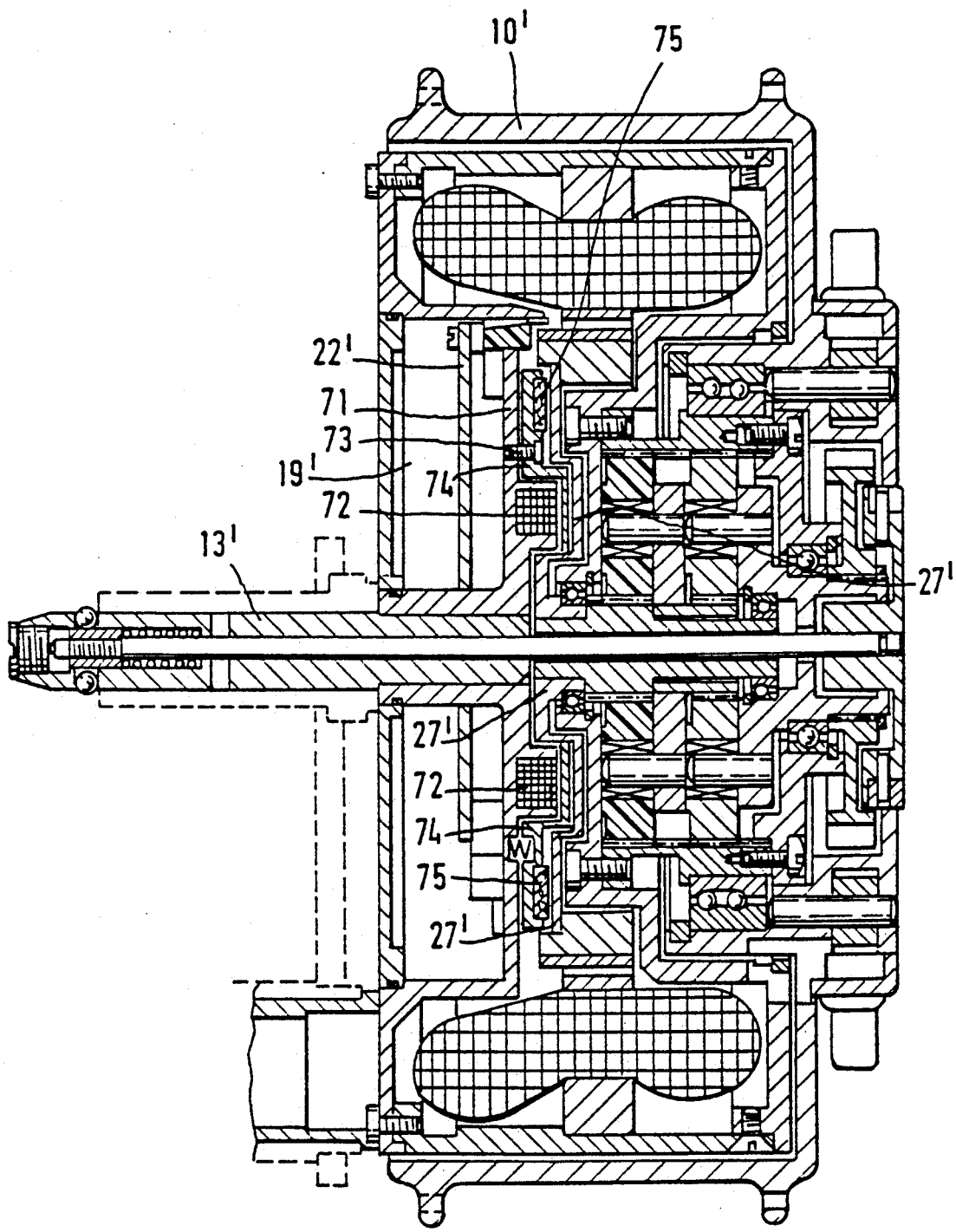
FIG. 5 is a view substantially showing a longitudinal section substantially corresponding to the view of FIG. 1 for an embodiment provided additionally with a braking device.

FIG. 5 shows a drive part in which an electro-magnetic spring force brake is integrated. In this Figure the parts of the drive which are described in connection with FIG. 1 are no longer identified. For the identical parts the same reference numerals are used with added prime indexes. The electromagnetic switch force brake is arranged between the rotor of the drive and a profiled bottom plate 71 of a trough housing 19 provided for receiving an electronic control device with the conductor plate 22'. A brake magnetic ring 72 is arranged in the bottom plate 71 symmetrically to the plug-in axle 13'. It cooperates with a ring-shaped, profiled brake magnet armature 74 which is guided in the plug-in 73 fixed in the base plate 71. The ring-shaped brake magnet armature is provided with a brake coating ring 75 which can act on the rotor 27'. The rotor 27', in deviation from the rotor 27 in FIG. 1, is profiled for a matching with the spring force brake.

It will be understood that each of the elements described above, or two or more together, may also find a useful application in other types of constructions differing from the types described above.

While the invention has been illustrated and described as embodied in a small vehicle, particularly a rolling chair, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A small vehicle, in particular a rolling chair, comprising a frame; at least two running wheels having hubs; a direct current motor provided with a transmission and a stator and located in a region of each of said hubs so as to drive a respective one of said running wheels; said running wheels being formed as movable wheels provided with plug-in axles releasable fixably on said frame so that said wheel can be fixed on the frame by plugging said wheels into said frame and released from the frame by plugging said wheels out of said frame, each of said direct current motors with a respective one of said transmissions being arranged inside a respective one of said hubs without projecting beyond the latter; and a supporting part, each of said stators of each of said direct current motors being fixable releasably on said frame through said supporting part.

2. A small vehicle as defined in claim 1, wherein said direct current motors are formed as hub motors.

3. A small vehicle as defined in claim 1; and further comprising a coupling arranged between said transmission of each of said motors and a respective one of said hubs.

4. A small vehicle as defined in claim 1; and further comprising a plug-in connection member provided for electrical conduits for supplying current and controlling said motors, said plug-in connection member being arranged in said frame and connectable with said supporting part.

5. A small vehicle as defined in claim 1, wherein said frame is a foldable frame.

6. A small vehicle as defined in claim 1; and further comprising a control device including a master processor arranged on said frame and associated motor processors for said motors, said motor processors being arranged at least partially in said hubs near said motors.

7. A small vehicle, in particular a rolling chair, comprising a frame; at least two running wheels having hubs; a direct current motor provided with a transmission and a stator and located in a region of each of said hubs so as to drive a respective one of said running wheels, said running wheels being formed as movable wheels provided with plug-in axles releasable fixably on said frame, each of said direct current motors with a respective one of said transmissions being arranged inside a respective one of said hubs without projecting beyond the latter; and a supporting part, each of said stators of each of said direct current motors being fixable releasably on said frame through said supporting part, said drive motors being formed as multi-pole, electronically commutated direct current motors with a permanent magnet rotor, said transmissions being formed as plant wheel transmissions.

8. A small vehicle as defined in claim 7, wherein said planet wheel transmission has a planet wheel carrier, said coupling having a toothed disc which is connected with said planet wheel carrier of said planet wheel transmission, and a driver adjustably supported in a respective one of said hubs and insertable in said toothed disc; and further comprising a switching ring supported on an outer side of a respective one of said hubs and accessible for a vehicle user so as to disengage said driver from said toothed disc.

9. A small vehicle as defined in claim 8, wherein said driver of said coupling is formed as a two-armed turning lever supported in a respective one of said hubs and having a free end provided with an arresting projection which cooperates with said toothed disc.

10. A small vehicle as defined in claim 8; and further comprising an electrical safety contact, and acting on said driver so as to move it one of its operational positions.

11. A small vehicle, in particular a rolling chair, comprising a frame; at least two running wheels having hubs; a direct current motor provided with a transmission and a stator and located in a region of each of said hubs so as to drive a respective one of said running wheels; said running wheels being formed as movable wheels provided with plug-in axles releasable fixably on said frame, each of said direct current motors with a respective one of said transmissions being arranged inside a respective one of said hubs without projecting beyond the latter; and a supporting part, each of said stators of each of said direct current motors being fixable releasably on said frame through said supporting parts, each of said motors having a chamber which surrounds said stator from all sides and also having a rotor and an associated chamber wall with an opening and also a permanent magnet; a control electronic part arranged in said closeable chamber of said stator; and a control p robe extending through said opening of said chamber wall and acted upon by said permanent magnet of said rotor.

12. A small vehicle as defined in claim 11; and further comprising an electromagnetic spring force brake arranged in a respective one of said hubs between said chamber and said rotor.

13. A small vehicle as defined in claim 1, wherein said supporting part is pluggable into and out of said frame.

14. A small vehicle, in particular a rolling chair, comprising a frame; at least two running wheels having hubs; a direct current motor provided with a transmission and a stator and located in a region of each of said hubs so as to drive a respective one of said running wheels; said running wheels being formed as movable wheels provided with plug-in axles releasable fixably on said frame, each of said direct current motors with a respective one of said transmissions being arranged inside a respective one of said hubs without projecting beyond the latter; and a supporting part, each of said stators of each of said direct current motors being fixable releasably on said frame through said supporting part; and an adaptor sleeve provided on said frame, said stator being releasably fixable in said adaptor sleeve.

* * * * *